US008191041B2

(12) United States Patent
Huang (10) Patent No.: US 8,191,041 B2
(45) Date of Patent: May 29, 2012

(54) JAVASCRIPT PRE-PROCESSING FRAMEWORK (75) Inventor: Tao Huang, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1322 days.

(21) Appl. No.: 11/648,962

(22) Filed: Jan. 3, 2007

(65) Prior Publication Data
US 2008/0163168 A1 Jul. 3, 2008

(51) Int. Cl.
G06F 9/44 (2006.01)

(52) U.S. Cl. ......... 717/115; 717/117; 717/118; 717/121

(58) Field of Classification Search .................. None
See application file for complete search history.

(56) References Cited

U.S. PATENT DOCUMENTS

| | | | |
|---|---|---|---|
| 6,061,698 A | 5/2000 | Chadha et al. | |
| 6,189,137 B1* | 2/2001 | Hoffman | 717/115 |
| 6,256,772 B1 | 7/2001 | Apte et al. | |
| 6,424,978 B1 | 7/2002 | Liu et al. | |
| 6,620,204 B1* | 9/2003 | Malcolm | 715/209 |
| 6,823,504 B1 | 11/2004 | Sokolov | |
| 6,951,014 B1* | 9/2005 | Sokolov | 717/139 |
| 2001/0044809 A1 | 11/2001 | Parasnis et al. | |
| 2002/0023143 A1* | 2/2002 | Stephenson et al. | 709/218 |
| 2002/0023261 A1* | 2/2002 | Goodwin et al. | 717/146 |
| 2002/0138526 A1* | 9/2002 | Crawford et al. | 707/530 |
| 2002/0174421 A1* | 11/2002 | Zhao et al. | 717/174 |
| 2003/0172197 A1* | 9/2003 | Dencker et al. | 709/328 |
| 2003/0222901 A1 | 12/2003 | Houck et al. | |
| 2004/0030717 A1 | 2/2004 | Caplin | |
| 2004/0243609 A1* | 12/2004 | Singh | 707/100 |
| 2005/0080880 A1 | 4/2005 | von Tetzchner et al. | |
| 2005/0262124 A1* | 11/2005 | Christensen et al. | 707/101 |
| 2005/0268225 A1 | 12/2005 | Pelegri-Llopart et al. | |
| 2006/0010134 A1* | 1/2006 | Davis et al. | 707/10 |
| 2006/0015842 A1* | 1/2006 | DeSantis | 717/106 |
| 2006/0234548 A1 | 10/2006 | Qing et al. | |
| 2007/0174419 A1* | 7/2007 | O'Connell et al. | 709/217 |

OTHER PUBLICATIONS

Asyncronous JavaScript Hypertext Preprocessor, http://www.devpro.it/AJSHP/.
JavaScript Utilities, http://projects.nikhilk.net/Projects/JSUtils.aspx.
Sortie—Cross Browser Javascript Utility Objects, http://thoth.robrohan.com/projects/sortie/.

* cited by examiner

Primary Examiner — Isaac Tecklu
(74) Attorney, Agent, or Firm — Wolf, Greenfield & Sacks, P.C.

(57) ABSTRACT

Embodiments of the invention provide a framework for pre-processing Javascript files. In some embodiments, the framework includes a pre-processor component operable to determine whether pre-release Javascript file versions include pre-processing commands in a predefined syntax which is defined by the framework. The pre-processor component may maintain a mapping between any or all of these commands and one or more handler programs, such that the handler program(s) may be invoked to perform any of various pre-processing functions on a pre-release file version. The framework may be extensible and scalable in that it may accommodate the addition of or modification to any number of handler programs. A new handler program may be developed and invoked, for example, via a new pre-processing command which is defined to the pre-processor component and mapped to the handler program.

14 Claims, 4 Drawing Sheets

JAVASCRIPT PRE-PROCESSING FRAMEWORK

BACKGROUND OF INVENTION

JAVASCRIPT is a widely used scripting language for creating web pages with dynamic functionality. JAVASCRIPT is typically provided in the form of a set of programmed instructions, such as in a file, object or other data structure. (For clarity, this data structure is hereinafter referred to as a "JAVASCRIPT file.") JAVASCRIPT may be used to create numerous types of functionality on a web page. For example, a JAVASCRIPT file may describe functionality for validating data entry by a user to a form presented on the web page, such as by defining formats for input provided by the user to various fields on the form. The JAVASCRIPT file may describe the behavior of the page in response to user input, such as presenting an error message to a user when he or she enters data in a "password" field on the form in a format which does not match a standard format defined by the JAVASCRIPT file.

In general, instructions provided in a JAVASCRIPT file are executed by a browser program, such as in response to input provided by a user. For example, the browser may execute JAVASCRIPT instructions defining the behavior of an object on the page when the user navigates the cursor over the object, such as to change the appearance of the object on the page. JAVASCRIPT is a scripting language, meaning that it is not compiled for execution by the browser. Rather, the browser downloads instructions in source code form from a server and interprets the instructions to establish functions, create variables, etc.

JAVASCRIPT is conventionally provided by the server to the browser using one of two techniques. The first technique is to embed the JAVASCRIPT directly into the hypertext markup language (HTML) content that defines a web page, such that the HTML downloaded from the server includes JAVASCRIPT instructions indicated via one or more HTML tags. Another technique is to provide a reference within the HTML to a separate JAVASCRIPT file. When the browser executes the HTML, it requests the referenced JAVASCRIPT file from the server.

Generally, a JAVASCRIPT is prepared for "release" (i.e. dissemination to one or more requesting browsers) by a team of developers who prepare the release version of the file from one or more pre-release versions. For example, multiple pre-release files may be consolidated into a single release version file so that the browser need only download a single file, rather than multiple files. Debug instructions used to test certain error conditions may be removed from a pre-release version. In addition, multiple versions of a release file may be created, each having messages or other content which is customized for users in specific locales (e.g., so as to present an error message to Japanese users in Japanese), and/or perform other tasks.

SUMMARY OF INVENTION

Applicants have appreciated that many of the tasks that are performed to prepare a JAVASCRIPT file for release are labor-intensive, error-prone and time-consuming. Accordingly, embodiments of the invention provide a framework for pre-processing JAVASCRIPT files. In some embodiments, the framework includes a pre-processor component operable to determine whether pre-release file versions include pre-processing commands provided in a predefined syntax defined by the framework. The pre-processor component may maintain a mapping between any or all of these pre-processing commands and one or more handler programs, such that one or more handler programs may be invoked (e.g., by the pre-processor component) to perform any of various pre-processing functions on the pre-release file version. The execution of the handler program(s) on the pre-release file version may cause a JAVASCRIPT file to be generated which is ready for release to users.

In some embodiments, the pre-processing framework is extensible and scalable in that it may accommodate the addition of or modification to any number of handler programs. A new handler program may be developed and invoked, for example, via a new pre-processing command which is defined to the pre-processor component and mapped to the handler program. In some implementations, the framework may provide a preliminary set of handler programs which provide functionality for dealing with common pre-processing issues. However, the invention is not limited to such an implementation.

A pre-processing framework may be implemented in accordance with embodiments of the invention in any of numerous ways. For example, a pre-processor component may be configured to execute on a standalone basis, such that release version JAVASCRIPT files are generated from pre-release file versions during a build process which is initiated by a user. In another implementation, a pre-processor component may be implemented within a web server application (e.g., as a filtering module), such that release file versions are generated dynamically from pre-release file versions in response to a web page request issued by a browser program. Of course, numerous other implementations are possible, as the invention is not limited in this respect.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Embodiments of the invention provide a framework for pre-processing JAVASCRIPT files. In some embodiments, the framework includes a pre-processor component configured to recognize one or more commands provided in a pre-determined syntax. The pre-processor component may, for example, maintain a mapping between each of these commands and one or more handler programs. As a result, when the pre-processor encounters a command in the predetermined syntax within a pre-release JAVASCRIPT file, the pre-processor component may invoke the handler program(s) mapped to the command. Any number of commands may be provided within a pre-release file version, as the invention is not limited in this respect. By executing the handler program(s) against the pre-release file version, the pre-processor component may generate the release version JAVASCRIPT file(s).

In some embodiments, the framework is extensible in that it accommodates any number of commands and/or handler programs to be defined, to provide any desired pre-processing function. For example, a new handler program may be developed and added to the framework by updating the mapping employed by the pre-processor component to indicate that when a particular command is encountered in a pre-release JAVASCRIPT file by the pre-processor component, the new handler program should be invoked. Of course, the mapping need not define a one-to-one relationship between commands and handler programs, as a single command may cause multiple handler programs to be invoked, or vice versa. The invention is not limited to a particular implementation.

The following paragraphs provide a brief overview of some common JAVASCRIPT pre-processing issues. An exemplary embodiment of a pre-processing framework which may help deal with these and other issues is then described with reference to FIG. 1.

One common pre-processing issue relates to consolidating multiple pre-release file versions into a single release file. In this respect, generally, multiple JAVASCRIPT files are created by a development team, because one larger file can be difficult to manage and organize. However, when JAVASCRIPT for a web page is provided in the form of multiple files rather than a single file, the browser is required to make multiple connections to the server to download each file. This can result in problems since each connection to the server has its own latency. For example, if a web page references five JAVASCRIPT files and the latency between the browser and server is 300 milliseconds, then the latency associated with viewing the web (i.e. to download each JAVASCRIPT file) page is 1.5 seconds. However, if a single JAVASCRIPT file is made available, the latency for viewing the web page is only 300 milliseconds, reducing the latency by 1.2 seconds.

Another common pre-processing issue relates to developing JAVASCRIPT files for use in international markets. As described above, to provide content that is appropriate for multiple locales, generally multiple versions of a JAVASCRIPT file are prepared, such that each version can be made available to users in a particular locale. It can be difficult and labor-intensive to maintain multiple versions of a particular JAVASCRIPT file, because all files must be kept consistent.

Yet another common pre-processing issue relates to debugging JAVASCRIPT code. When a JAVASCRIPT file is developed, generally a debug version of the file is created to test each error condition defined by the file. For example, a developer may insert instructions into the code to test a particular error condition and present a message when that error condition has arisen. However, it is generally not desirable to release the debug version because these detailed messages may not be appropriate to display to the user. As a result, these instructions and/or error messages are typically removed from the JAVASCRIPT file before it is released. For example, individual error messages designed to indicate when a specific error condition has arisen may be replaced by a more general message that an error has occurred.

Figure 1:
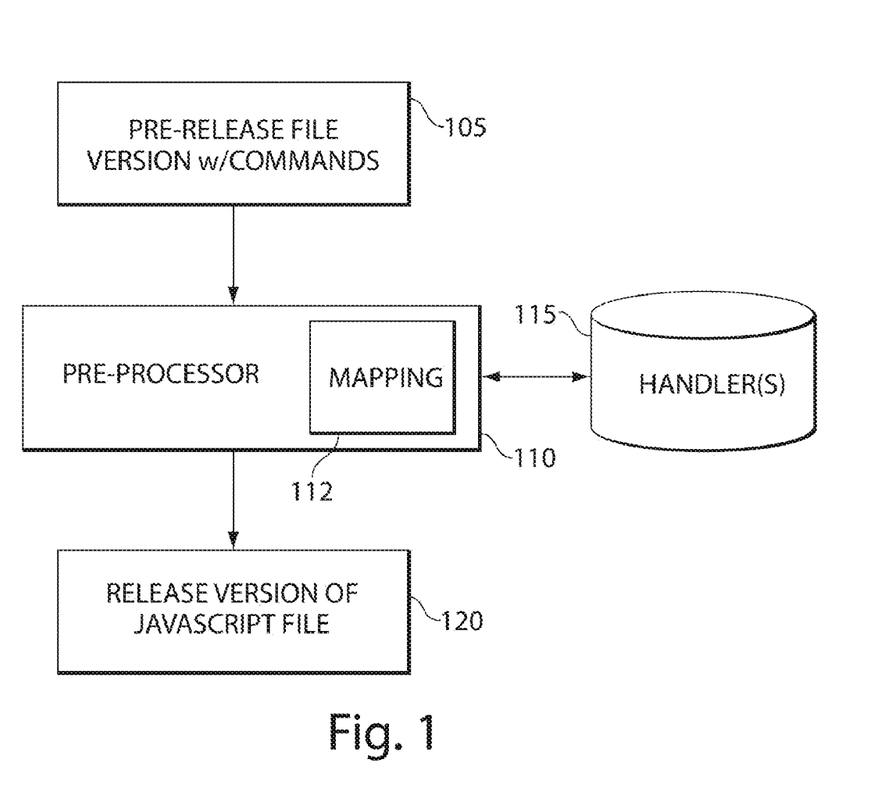
FIG. 1 is a block diagram depicting exemplary components for pre-processing JAVASCRIPT files, in accordance with some embodiments of the invention.

To deal with pre-processing issues of these and other types, embodiments of the invention provide a pre-processing framework which includes a pre-processor component operable to recognize commands in a predefined syntax within pre-release JAVASCRIPT file versions, and invoke one or more handler programs to perform various pre-processing functions, thereby generating release version JAVASCRIPT files. FIG. 1 depicts exemplary components of a pre-processing framework implemented in accordance with embodiments of the invention.

In FIG. 1, pre-release file version 105 includes one or more commands provided in a predetermined syntax. For example, in one implementation, the syntax for pre-processing commands is expressed as follows:

"^\\#(?<preprocesstag>\\w+)\\s*\\(?(?<parameters>[^]*)\\) ?$"

In this exemplary syntax, "<preprocesstag>" defines generally the handler program which is to be invoked to perform pre-processing functions, and "<parameters>" defines generally arguments, parameters, and/or other information which are passed to the handler program for performing these functions. Of course, it should be appreciated that any suitable command syntax may be employed, and that the above represents merely one example. Any suitable syntax may be employed, as the invention is not limited in this respect.

In FIG. 1, pre-processor component 110 is configured to recognize commands provided in the predefined syntax within pre-release JAVASCRIPT file 105. Pre-processor 110 provides mapping 112, which defines a relationship between commands provided in this syntax and one or more handler programs 115. A command may be mapped to any suitable number of handler programs, as mapping 112 need not define a one-to-one relationship between commands and handler programs. For example, multiple commands may be mapped to a single handler program, and a single command may be mapped to multiple handler programs. The invention is not limited to a particular implementation.

In some embodiments, when pre-processor component 110 encounters a command in a redefined syntax within pre-release file version 105, it employs mapping 112 to determine which handler program(s) 115 to invoke. Mapping 112 may take any suitable form. For example, in some embodiments mapping 112 is provided in the form of a data structure storing a set of name-value pairs. In these embodiments, when pre-processor component 110 encounters a command in the predefined syntax, it performs a lookup on the data structure based on the command encountered, and locates the handler program(s) based on the indication provided. Of course, numerous implementations are possible.

A pre-release file may include any suitable number of commands. Further, any suitable number of handler programs (including one) may be invoked to perform pre-processing functions on pre-release file version 105. The invention is not limited in this respect.

A handler program may provide any suitable pre-processing function. For example, in one exemplary implementation of a pre-processing framework, a handler program is provided to include, or incorporate, external information into a pre-release file version. This handler program may be useful, for example, to incorporate one or more JAVASCRIPT files within a pre-release JAVASCRIPT file version, such that files need not be manually combined.

For example, a pre-release version file may include a command which, when encountered by a pre-processor component, causes the pre-processor component to invoke the handler program to incorporate the contents of one or more other JAVASCRIPT files within the considered pre-release file. The other files may, for example, be referenced by the command. For example, the syntax of the command may provide for parameters that identify the files to be incorporated. For example, the syntax of the command may, for example, be:
include (file 1, file 2, ... )

The syntax given above is merely exemplary, and that any suitable syntax may be employed. Further, it should be appreciated that any suitable number of additional files, or other data structures, may be incorporated into a pre-release file version, as the invention is not limited in this respect.

In some embodiments, when the above-described handler program is executed, the referenced additional files are incorporated into the pre-release file version which includes the command. As a result of incorporating the additional files, a single JAVASCRIPT file may be prepared for release, thereby avoiding the latency problems described above associated with providing multiple JAVASCRIPT files.

The above-described handler program is merely one example of a program that may be invoked to perform pre-processing functions on a pre-release file version. Any number of handler programs may be provided and/or invoked to perform pre-processing functions, as the invention is not limited in this respect. In some embodiments, a result of invoking one or more handler programs to perform pre-processing functions on pre-release file version 105, pre-processor component 110 generates release version JAVASCRIPT file 120.

Figure 2:
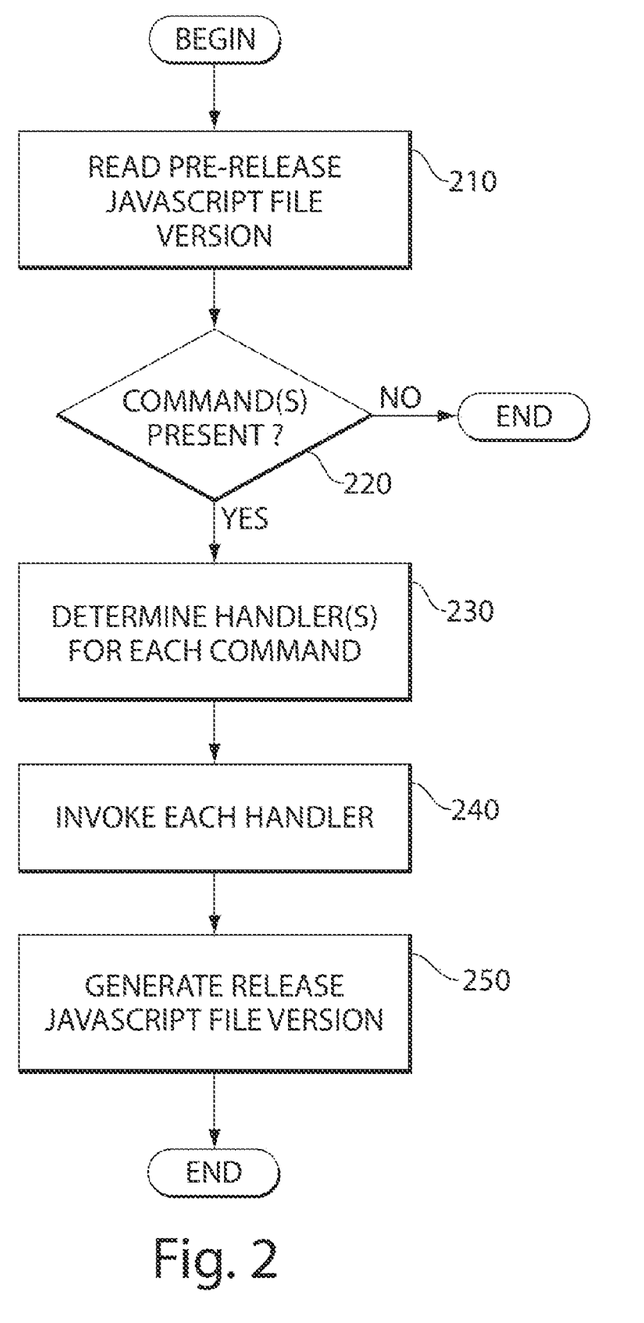
FIG. 2 is a flowchart depicting an exemplary pre-processing technique in accordance with some embodiments of the invention.

FIG. 2 is a flowchart which depicts exemplary pre-processing associated with converting a pre-release file version into a release file version in greater detail. At the start of the process, a pre-release JAVASCRIPT file is read (e.g., by pre-processor component 110, FIG. 1) in act 210.

In act 220, a determination is made (e.g., by pre-processor component 110) whether one or more commands in a pre-defined syntax (e.g., the syntax provided above) are provided in the pre-release JAVASCRIPT file. This determination may be made in any of numerous ways. For example, pre-processor component 110 may scan the pre-release JAVASCRIPT file to determine whether any commands in the predefined syntax are present.

If it is determined in act 220 that no commands in the predefined syntax are present, process 200 ends. However, if it is determined that one or more commands are present in the file, the process proceeds to act 230, wherein one or more handler programs are determined for each command. This also may be performed in any of numerous ways. For example, in some embodiments, pre-processor component 110 may employ mapping 112 to determine the handler program(s) associated with each command defined within the pre-release file. For example, mapping 112 may define a relationship between each command and one or more of handler programs 115.

The process then proceeds to act 240, wherein the handler program(s) determined in act 230 is (are) invoked. For example, pre-processor component may launch one or more of handler programs 115, passing each handler program one or more parameters, such as is described above. After the processing performed by each handler program invoked in act 240 is complete, in act 250 a release version JAVASCRIPT file, having had one or more pre-processing functions performed thereon, is generated. Process 200 then completes.

A pre-processing framework providing the functionality and capabilities described herein may be implemented in any of numerous ways. For example, in some embodiments, a pre-processing framework may include a pre-processing component which is implemented as a stand-alone program (or programs) that a user executes during a build process, so as to convert one or more pre-release file versions to release file versions. In other embodiments, a pre-processing framework may include one or more components which are integrated with or otherwise implemented via a web server application, such that release file versions are dynamically generated in response to web page requests processed by the web server. For example, in some embodiments, one or more components may be implemented via a filter program, which those skilled in the art will recognize are commonly used to provide functionality associated with responding to web page requests. For example, a filter program may be employed to provide client authentication functionality. As an example, a filter program may maintain or have access to a list of internet protocol (IP) addresses which are blocked (e.g., are not allowed to request certain web pages). If a web page request is issued from an IP address which is on the list of blocked addresses, the request may be denied.

Figure 3:
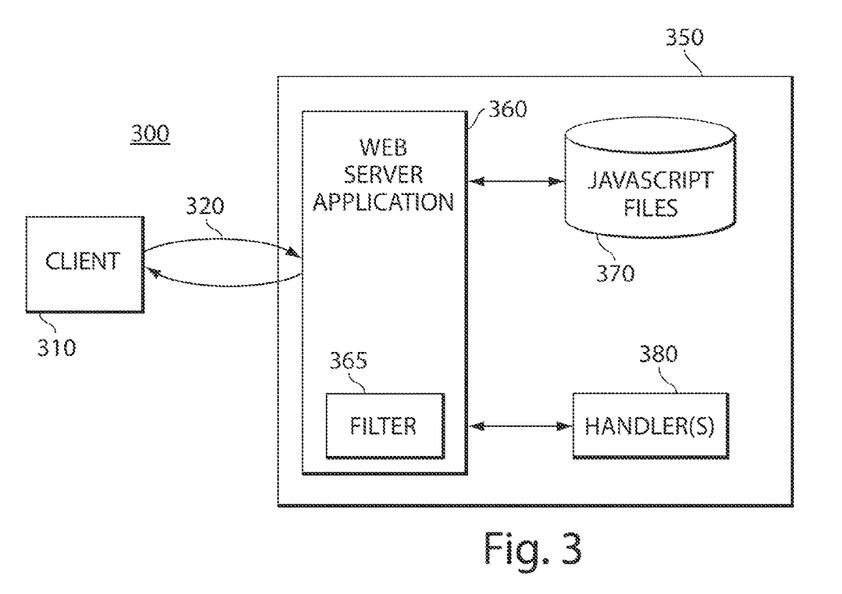
FIG. 3 is a block diagram depicting an exemplary implementation of a pre-processor in accordance with some embodiments of the invention.

FIG. 3 depicts an embodiment of the present invention wherein a pre-processing framework is implemented via a filter program. Specifically, FIG. 3 depicts system 300, which includes client 310 and server 350. Server 350 includes web server application 360, JAVASCRIPT files 370 and handler programs 380. Web server 360 includes filter program 365, which provides functionality associated with responding to web page requests issued by client 310.

Arc 320 represents a web page request issued by client 310 to server 350. The request is received by web server application 360. In this example, the requested web page includes (e.g., has embedded in or references) one or more JAVASCRIPT files. Web server application 360 is configured to process web page requests issued by a client by invoking filter program 365. When web server application 360 receives the request and invokes filter program 365, the filter program provides functionality similar to that which is provided by pre-processor component 110 (FIG. 1). Specifically, filter program 365 is configured to recognize commands provided in a predefined syntax, to maintain a mapping between each of these commands and one or more handler programs 380, and to invoke the handler program(s) to perform pre-processing functions on one or more JAVASCRIPT files.

In system 300, the JAVASCRIPT files referenced by the requested web page are provided in JAVASCRIPT files 370. In this example, each file is provided in a pre-release version, such that each includes commands, for example, like those described above with reference to FIGS. 1-2.

In the example shown, filter program 365 is configured to retrieve the JAVASCRIPT files included in the requested page from JAVASCRIPT files 370, and read each file to determine whether any commands are provided in a predefined syntax. If so, filter program 365 employs a mapping, which may be hard-coded within filter-program 365, maintained in a separate data structure (e.g, in one or more files or objects), or provided in any other suitable form, to determine which handler program(s) to invoke. Once this determination is made, filter program 365 invokes one or more of handler programs 380. Execution of the handler program(s), in some embodiments, performs pre-processing functions on the pre-release file versions stored in JAVASCRIPT files 380, so as to generate a release version to be included in the requested web page. Web server application 360 then transmits a response indicated by arc 330 to client 310, which response includes the requested web page and release versions of the JAVASCRIPT files referenced by the page.

Of course, it should be appreciated that pre-processing functionality need not be implemented via a filter program, as numerous other implementations are possible. For example, the web server application itself may perform pre-processing functions, or may be configured to invoke a separate program which is not a filter program. Numerous other implementations are possible.

A pre-processing framework implemented in accordance with embodiments of the invention may be flexible and extensible. For example, in some embodiments, a pre-processing framework may accommodate any number of handler programs to provide any desired pre-processing functionality. In some embodiments, a facility is provided for defining new handler programs and/or commands for invoking those commands, removing handler programs, and modifying existing handler programs so as to, for example, improve the pre-processing functionality provided thereby.

Figure 4:
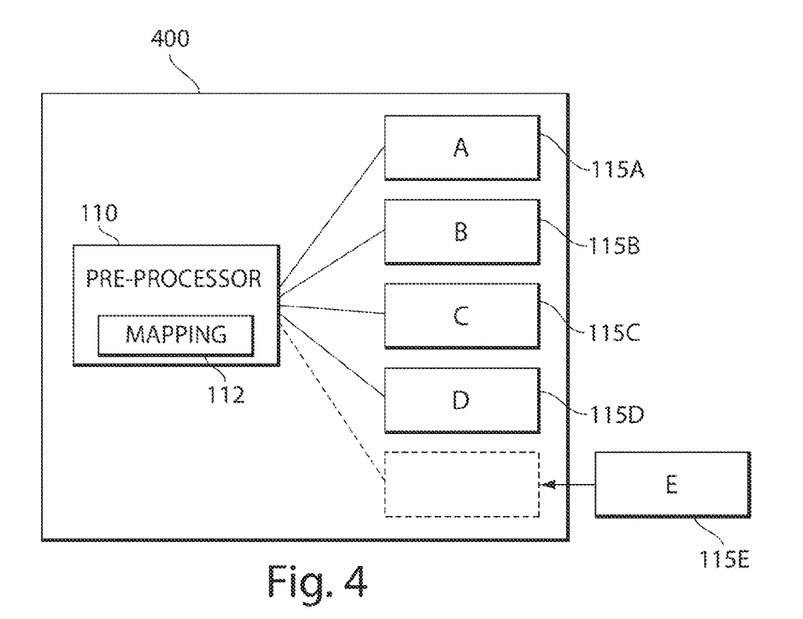
FIG. 4 is a block diagram depicting a pre-processing framework in accordance with some embodiments of the invention.

An exemplary pre-processing framework 400 implemented in accordance with embodiments of the invention is depicted in FIG. 4. Framework 400 includes pre-processor component 110, mapping 112 and various handler programs 115A-115D. As described above, pre-processor component 110 may be configured to read pre-release versions of JAVASCRIPT files to determine whether those files contain commands provided in predefined syntax, to employ mapping 112 to determine one or more handler programs 115 to invoke, and to invoke the identified programs to convert the pre-release JAVASCRIPT file versions to release file versions.

In the example shown, framework 400 is designed to accommodate new handler program 115E. For example, handler program 115E may be incorporated into framework 400 by providing programmed instructions defining handler program 115E to framework 400, and modifying mapping 112 to define a command in a predefined syntax and to reference handler program 115E. Thereafter, when pre-processor component 110 encounters the command defined in mapping 112, pre-processor component 110 may invoke handler program 115E. Of course, this manner of implementing new handler programs is merely exemplary, and those skilled in the art may envision numerous other techniques.

A handler program may be implemented in any suitable fashion, as the invention is not limited in this respect. As an example, in some embodiments, handler programs (and pre-processor component 110) may be written in C#.

A pre-processing framework implemented in accordance with embodiments of the invention may include any number of handler programs, providing any form or type of pre-processing functionality, as the invention is not limited in this respect. Further, a pre-processing framework implemented in accordance with embodiments of the invention may include one or more handler programs designed to deal with common pre-processing issues, such as those described above. For example, one or more handler programs may be provided to deal with removing debug statements from a pre-release version of a JAVASCRIPT file. For example, in some embodiments, one or more handler programs may be invoked to generate a log of debug statements provided in a pre-release version of a JAVASCRIPT file. In some embodiments, these handler program(s) may be invoked using a command provided in the following syntax:

debug ('string')

Processing the command above may, in some embodiments, generate debug log statements for the release file version, thereby generating a release file version without debug statements.

In some embodiments, a pre-processing framework may implement certain pre-processing functionality without invoking a handler program, such as functionality which is deemed desirable for all pre-processing. For example, some embodiments provide a pre-processing framework which performs compression and versioning functions on all pre-release JAVASCRIPT file versions. In this respect, a compression function may remove information from a pre-release file version, such that the bandwidth required to transfer the release version may be minimized. For example, information such as blank spaces and line feeds may be removed from a pre-release file version. In addition, compression may rename one or more variable names employed by a pre-release file version so that those names include fewer characters.

Versioning may be performed to ensure that a newly released JAVASCRIPT file is processed by a browser program that receives it. In this respect, many browser programs are configured to cache JAVASCRIPT files referenced by a web page, so that the files are downloaded only once rather than every time a page referencing the file is loaded. This can be problematic if a new version of a JAVASCRIPT file is released, since the browser may not download it. Conventionally, JAVASCRIPT files are renamed to avoid this issue, since the browser determines whether or not it needs to download the file based on the file name. However, updating each web page which references a JAVASCRIPT file can be labor-intensive and error-prone.

Consequently, some embodiments of the invention perform versioning functions which update web pages that reference a JAVASCRIPT file that has been updated. For example, pre-processor component 110 may be configured to automatically update a web page which references a JAVASCRIPT file that has been updated, such that the browser downloads it rather than referring to the cached version.

Figure 5:
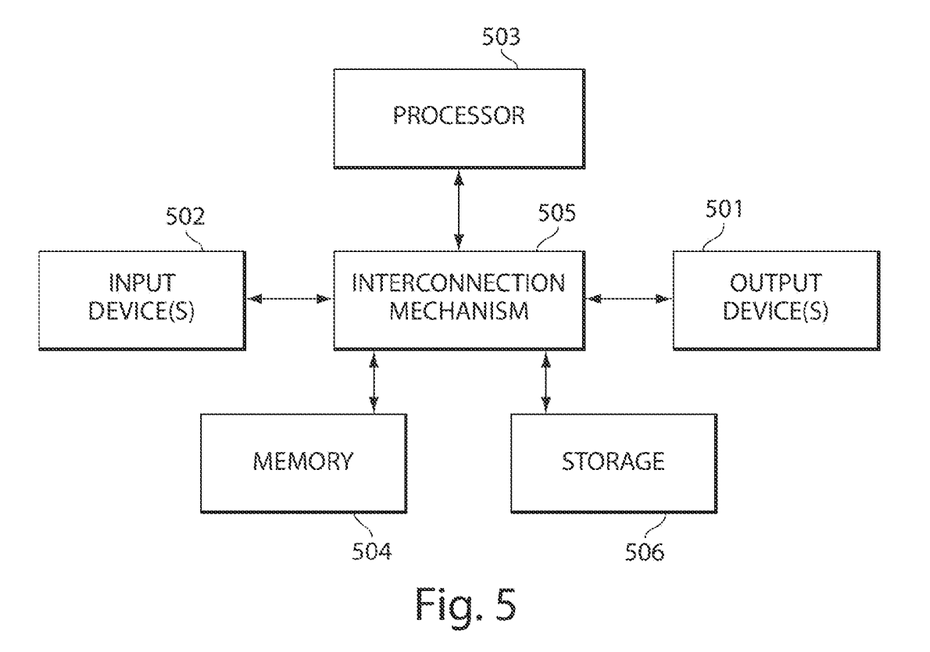
FIG. 5 is an exemplary computer system on which aspects of the invention may be implemented.

Various aspects of the systems and methods for practicing features of the invention may be implemented on one or more computer systems, such as the exemplary computer system 500 shown in FIG. 5. Computer system 500 includes input device(s) 502, output device(s) 501, processor 503, memory system 504 and storage 506, all of which are coupled, directly or indirectly, via interconnection mechanism 505, which may comprise one or more buses, switches, networks and/or any other suitable interconnection. The input device(s) 502 receive input from a user or machine (e.g., a human operator, telephone receiver, or other user or machine) and the output device(s) 501 display or transmit information to a user or machine (e.g., a liquid crystal display). The processor 503 typically executes a computer program called an operating system (e.g., a Microsoft Windows®-family operating system or other suitable operating system) which controls the execution of other computer programs, and provides scheduling, input/output and other device control, accounting, compilation, storage assignment, data management, memory management, communication and data flow control. Collectively, the processor and operating system define the computer platform for which application programs in other computer programming languages are written.

The processor 503 may also execute one or more computer programs to implement various functions. These computer programs may be written in any type of computer programming language, including a procedural programming language, object-oriented programming language, macro language, or combination thereof. These computer programs may be stored in storage system 506. Storage system 506 may hold information on a volatile or nonvolatile medium, and may be fixed or removable. Storage system 506 is shown in greater detail in FIG. 6.

Figure 6:
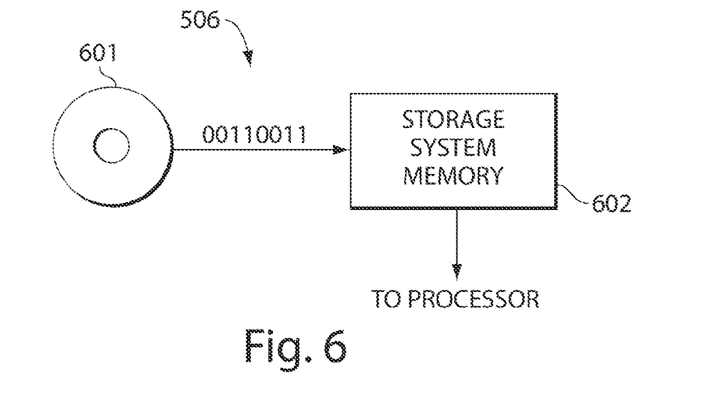
FIG. 6 is a block diagram depicting an exemplary computer system memory on which programmed instructions defining aspects of the invention may be stored.

Storage system 506 typically includes a computer-readable and writeable nonvolatile recording medium 601, on which signals are stored that define a computer program or information to be used by the program. The medium may, for example, be a disk or flash memory. Typically, in operation, the processor 503 causes data to be read from the nonvolatile recording medium 601 into a volatile memory 602 (e.g., a random access memory, or RAM) that allows for faster access to the information by the processor 503 than does the medium 601. This memory 602 may be located in storage system 506, as shown in FIG. 6, or in memory system 504, as shown in FIG. 5. The processor 503 generally manipulates the data within the integrated circuit memory 504, 602 and then copies the data to the medium 601 after processing is completed. A variety of mechanisms are known for managing data movement between the medium 601 and the integrated circuit memory element 504, 602, and the invention is not limited thereto. The invention is also not limited to a particular memory system 504 or storage system 506.

It should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

A computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface including keyboards, and pointing devices, such as mice, touch pads, and digitizing tables. As another example, a computer may receive input information through speech recognition or in other audible format.

Computers may be interconnected by one or more networks in any suitable form, including a local area network or a wide area network, such as an enterprise network or the Internet. Networks may be based on any suitable technology and may operate according to any suitable protocol and may include wireless networks, wired networks or fiber optic networks. Also, the various methods or processes outlined herein may be coded as software that is executable on one or more processors that employ any one of a variety of operating systems or platforms. Additionally, such software may be written using any of a number of suitable programming languages and/or conventional programming or scripting tools, and also may be compiled as executable machine language code or intermediate code that is executed on a framework or virtual machine.

In this respect, the invention may be embodied as a computer readable medium (or multiple computer readable media) (e.g., a computer memory, one or more floppy discs, compact discs, optical discs, magnetic tapes, flash memories, circuit configurations in Field Programmable Gate Arrays or other semiconductor devices, etc.) encoded with one or more programs that, when executed on one or more computers or processors, perform methods that implement the various embodiments of the invention described above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of the present invention as discussed above. Additionally, it should be appreciated that one or more computer programs that, when executed, perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. In a system comprising a client computer, a server computer and at least one communication medium coupling the client computer and server computer, a method, performed by the server computer, of pre-processing a file comprising commands programmed in a scripting programming language prior to delivery of the file to the client computer, the method comprising acts of:
    (A) identifying, within the file, a plurality of commands each characterized by a different, predefined syntax;
    (B) identifying, for each of the plurality of commands, at least one handler program to invoke, the at least one handler program identified for each one of the plurality of commands being different than the at least one handler program identified for each other of the plurality of commands, the at least one handler program identified for at least one of the plurality of commands being operable to remove debug statements from the file; and
    (C) invoking the at least one handler program identified in (B) for each one of the plurality of commands to perform at least one pre-processing function.

2. The method of claim 1, wherein the act (B) comprises employing a mapping to identify the at least one handler program to invoke for each one of the plurality of commands.

3. The method of claim 1, wherein the at least one pre-processing function comprises incorporating the contents of at least one other data structure in the file.

4. The method of claim 1, wherein the acts (A), (B) and (C) are performed by a web server application implemented on the server computer.

5. The method of claim 4, wherein the acts (A), (B) and (C) are performed by a filter program implemented via the web server application.

6. A server computer for use in a system comprising the server computer, a client computer and at least one communication medium coupling the server computer and the client computer, the server computer comprising:
- a pre-processor component operable to read a file comprising commands programmed in a scripting programming language and to identifying, within the file, a plurality of commands each characterized by a different, predefined syntax;
- a plurality of handler programs which, when invoked, each performs at least one pre-processing function;
- a mapping component operable to define a relationship between each predefined syntax and at least one of the plurality of handler programs, each predefined syntax being related to a different at least one handler program than each other predefined syntax;
- wherein the pre-processor component is further operable to identify, based upon relationships defined by the mapping component, a different at least one handler program to invoke for each one of the plurality of commands, the at least one handler program identified for at least one of the plurality of commands being operable to remove debug statements from the file.

7. The server computer of claim 6, wherein the mapping component is implemented by the pre-processor component.

8. The server computer of claim 6, wherein the pre-processor component is further operable to compress the file by performing at least one of removing a space from the file, removing a line feed from the file, and renaming a variable in the file.

9. The server computer of claim 6, further comprising a web server application, and wherein the pre-processor component is implemented by the web server application.

10. The server computer of claim 9, wherein the web server application comprises a filter program, and wherein the pre-processor component is implemented by the filter program.

11. The server computer of claim 6, wherein the pre-processor component is implemented as a stand-alone component.

12. At least one computer-readable medium having instructions encoded thereon which, when executed in a system comprising a server computer, a client computer and at least one communication medium coupling the client computer and server computer, perform a method comprising acts of:
- (A) accommodating the definition of a plurality of handler programs which each, when executed, performs a different at least one pre-processing function on a file comprising a command programmed using a scripting programming language, at least one of the plurality of handler programs being operable to remove debug statements from the file; and
- (B) accommodating the definition of a relationship between each one of the plurality of handler programs and a command in the scripting programming language exhibiting a different, predefined syntax, so that when a command exhibiting a predefined syntax is encountered, the handler program corresponding to a command exhibiting a first predefined syntax being different than the handler program corresponding to a command exhibiting a second predefined syntax.

13. The at least one computer-readable medium of claim 12, further comprising instructions defining acts of:
- (C) determining whether a file comprising commands in a scripting programming language includes a command exhibiting a predefined syntax;
- (D) if it is determined that the file includes a command in a predefined syntax, determining a handler program to invoke based on the relationship defined in (B); and
- (E) invoking the handler program to perform the at least one pre-processing function on the file.

14. The at least one computer-readable medium of claim 12, wherein the acts (A), (B) and (C) are performed by the server computer.

* * * * *